United States Patent
Kuster

(10) Patent No.: US 11,001,390 B2
(45) Date of Patent: May 11, 2021

(54) HELICOPTER HYBRID ENGINE SYSTEM

(71) Applicant: Martin Kuster, Walchwil (CH)

(72) Inventor: Martin Kuster, Walchwil (CH)

( * ) Notice: Subject to any disclaimer, the term of this patent is extended or adjusted under 35 U.S.C. 154(b) by 803 days.

(21) Appl. No.: 15/642,610

(22) Filed: Jul. 6, 2017

(65) Prior Publication Data
US 2018/0009542 A1  Jan. 11, 2018

Related U.S. Application Data
(60) Provisional application No. 62/358,655, filed on Jul. 6, 2016.

(51) Int. Cl.
| | | |
|---|---|---|
| *B64D 35/08* | (2006.01) | |
| *B64D 27/02* | (2006.01) | |
| *B60L 50/16* | (2019.01) | |
| *B64D 27/24* | (2006.01) | |
| *B64D 31/06* | (2006.01) | |
| *B64D 35/02* | (2006.01) | |
| *B64C 27/04* | (2006.01) | |

(52) U.S. Cl.
CPC .............. *B64D 35/08* (2013.01); *B60L 50/16* (2019.02); *B64D 27/24* (2013.01); *B64D 31/06* (2013.01); *B64D 35/02* (2013.01); *B60L 2200/10* (2013.01); *B64C 27/04* (2013.01); *B64D 2027/026* (2013.01); *Y02T 50/60* (2013.01)

(58) Field of Classification Search
CPC ... B64D 2027/026; B64D 27/24; B64D 35/08
See application file for complete search history.

(56) References Cited

U.S. PATENT DOCUMENTS

| | | | |
|---|---|---|---|
| 9,914,536 B2* | 3/2018 | Rossotto | B64C 27/14 |
| 10,308,358 B2* | 6/2019 | Phan | B64C 39/024 |
| 2010/0013223 A1* | 1/2010 | Certain | B60K 6/48 |
| | | | 290/31 |

FOREIGN PATENT DOCUMENTS

| | | |
|---|---|---|
| DE | 202008002249 U1 | 4/2008 |
| EP | 2815966 A1 | 12/2014 |
| WO | WO2016049030 A1 | 3/2016 |
| WO | 2018007975 A1 | 1/2018 |

OTHER PUBLICATIONS

International Preliminary Report on Patentability in Related PCT Application PCT/IB2017/054079, dated Jan. 8, 2019, 8 pages.
International Search Report and Written Opinion in Related PCT Application No. PCT/IB2017/054079 dated Oct. 6, 2017, 14 pages.

* cited by examiner

*Primary Examiner* — Brian M O'Hara
(74) *Attorney, Agent, or Firm* — Kilpatrick Townsend & Stockton LLP

(57) ABSTRACT

A helicopter may include a hybrid engine system including an internal combustion engine (e.g., a turbine engine) and an electric engine. The internal combustion engine and the electric engine being coupled to the rotor system and configured to separately or collectively operate the rotor system in response to a triggering event. In one aspect, a method for operating a rotor system of a helicopter may include receiving an indicator of a triggering event and actuating a non-active engine, one of the internal combustion engine or the electric engine, in response to receiving the triggering event.

8 Claims, 5 Drawing Sheets

HELICOPTER HYBRID ENGINE SYSTEM

REFERENCE TO RELATED APPLICATIONS

This application claims the benefit of U.S. Provisional Application No. 62/358,655, filed Jul. 6, 2016 and entitled HELICOPTER HYBRID ENGINE SYSTEM, which is incorporated in its entirety by this reference.

TECHNICAL FIELD

The present disclosure relates to helicopter engines, and, more particularly (although not necessarily exclusively), to a hybrid engine system including an electric engine for operating a main rotor of a helicopter in certain conditions.

BACKGROUND

A traditional helicopter vehicle may include one or more rotor systems for providing lift or thrust to allow the helicopter to take off and land vertically, to fly, and to hover in the air. The ability of a helicopter to hover and travel vertically may make helicopters preferable to other aircrafts (e.g., airplanes) as minimal space is required for taking off and landing the helicopter. For example, buildings such as hospitals, skyscrapers, and residential homes, may include heliports or other landing platforms for helicopters.

A helicopter may be powered by an engine that drives the rotor systems. For example, a helicopter may include a turbine engine or other internal combustion engine. The turbine engine may drive a rotor system, causing rotor blades attached to the rotor system to rotate and provide the lift or thrust needed to operate the helicopter. However, the noise generated by turbine engines during operation of a helicopter may make their use undesirable or prohibited in certain environments.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to some aspects of the disclosure, a system may include an electric engine couplable to a rotor system of a helicopter. The electric engine may be configured to operate the rotor system in the absence of a load to the rotor system from an internal combustion engine helicopter.

In certain aspects, the operation of the rotor system may be switchable between the internal combustion engine and the electric engine by a switch device operable by an operator of the helicopter. In additional and alternative aspects, the operation of the rotor system may be automatically switchable between the engines by a processing device in response to a triggering event.

According to other aspects of the present disclosure, a hybrid engine system may include an internal combustion engine and an electric engine couplable to a rotor system of a helicopter for operating the rotor system. The electric engine may be configured to operate the rotor system in the absence of a load to the rotor system from the internal combustion engine. The electric engine may also include a computing device couplable to the internal combustion engine and the electric engine for switching operation of the rotor system between the internal combustion engine and the electric engine.

In certain aspects, the hybrid engine system may also include a power source for providing stored energy to the electric engine for operating the rotor system. In additional aspects, the hybrid engine system may also include a power generator for generating energy that may be stored by the power source.

According to other aspects of the present disclosure, a method for operating a rotor system of a helicopter may include receiving, by a computing device, an indicator of a triggering event. The method may also include actuating one of a first engine or a second engine in response to receiving the triggering event. The first engine and the second engine may be coupled to the rotor system and may be configured to separately operate the rotor system. In certain aspects of the method, the first engine and the second engine may include an electric engine and an internal combustion engine.

The details of one or more aspects and examples are set forth in the accompanying drawings and the description below. Other features and aspects will become apparent from the description, the drawings, and the claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
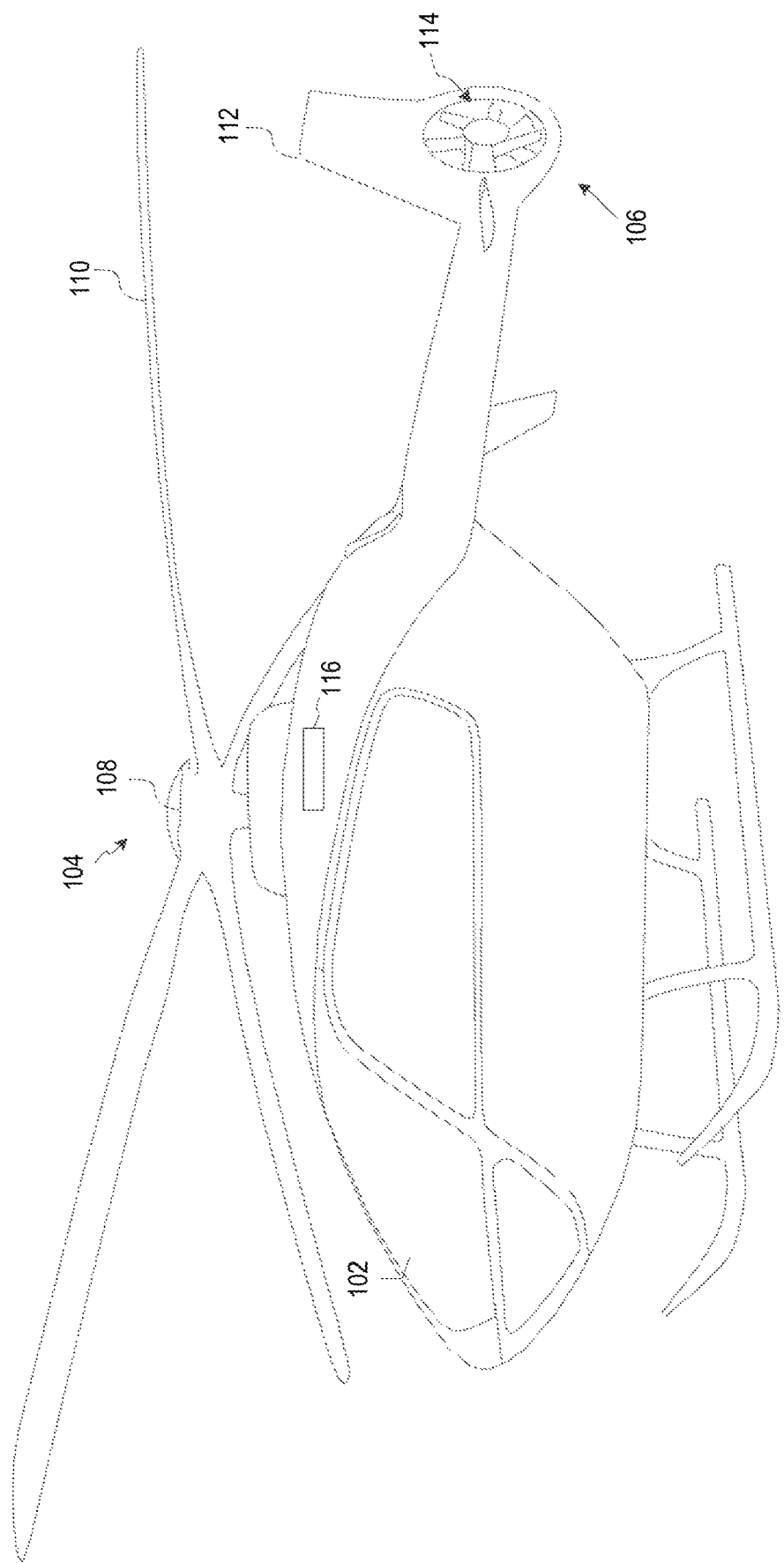
FIG. 1 is a schematic view of an example helicopter including a hybrid engine system according to certain aspects of the present disclosure.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "forward," "aft," "up," "down," "top," "left," "right," "front," "back," and "corners," among others are intended to refer to the orientation as illustrated and described in the figure (or figures) to which the components and directions are referencing.

Certain aspects and features relate to a hybrid engine system for a helicopter. The hybrid engine system may include an internal combustion engine and an electric engine, each positioned in the fuselage of a helicopter to individually operate a rotor system of the helicopter. The hybrid engine system may be configured to actuate one, or both, of the electric engine and the internal combustion engine in response to a triggering event. In some aspects, the hybrid engine system may include a switch device manually operable to change the operation of the rotor system between the internal combustion engine and the electric engine, or to actuate both the internal combustion and the electric engine simultaneously. In additional and alternative aspects, the hybrid engine system may include a processing device configured to actuate the engines. In some examples, the switch device or the processing device may be configured to automatically switch the operation of the rotor engine from the internal combustion engine to the electric engine in response to a failure of the internal combustion engine to operate the rotor. The electric engine may provide an amount of power for operating the rotor that is sufficient to land an airborne helicopter or to allow the helicopter to take off from a helicopter pad or other surface. In another example, the switch device may be manually controlled by a pilot of the helicopter or other operator to switch the operation of the rotor system from the internal combustion engine to the electric engine for purposes of landing the helicopter, starting up the helicopter, or taking off from a heliport.

In another example, the switch device or the processing device may be configured to automatically switch the operation of the rotor engine from the electric engine to the internal combustion engine in response to a failure of the internal combustion engine to operate the rotor. In additional and alternative aspects, the electric engine may also be used together with the internal combustion engine to increase the power output in difficult situations or environments.

A helicopter including a hybrid engine system according to aspects of the present disclosure may be useful in environments having noise level restrictions. Helicopters having only turbine engines or other internal combustion engines generating loud noises during operation may not be permitted to land or takeoff from certain areas. For example, many cities have noise ordinances that prevent the use of helicopters for emergencies in densely populated areas (e.g., a residential area). However, the use of helicopters to land and takeoff without the need of a runway or other significant space makes helicopters ideal vehicles for responding quickly to emergencies (e.g., evacuation efforts, medical situations) occurring in the densely populated areas. The noise generated by the electric engine may be significantly lower than the noise generated by the internal combustion engine and within a decibel limit or range imposed by many noise ordinances. Thus, the ability of a hybrid engine system to switch between the internal combustion engine and the electric engine for purposes of landing and taking off may expand the use of the helicopter in emergency and other desirable, but noise-restricted, situations and environments.

A helicopter including a hybrid engine system according to aspects of the present disclosure may also weigh less than conventional dual-engine helicopter systems. For example, a two-turbine-engine system may be more expansive inside and weigh considerable more than a hybrid engine system having one turbine engine and an electric engine. The reduced weight of the hybrid engine system, in some aspects, may increase fuel efficiency of the plane, and also may result in less time and costs for inspection, maintenance, and repair that may otherwise be necessary for a heavier helicopter system. Further, the electric engine may be more reliable than the internal combustion engine in certain environments. For example, the electrical engine system may not be as sensitive as the internal combustion engine in abnormal airspace conditions, such as thick air, thin air, or polluted air (e.g., dust or ash in the air).

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

FIG. 1 illustrates an example of a helicopter 100 that may include a hybrid engine system according to some aspects of the present disclosure. The helicopter 100 includes a fuselage 102 having a cabin that may be sized to accommodate one or more pilots and passengers in the helicopter 100. The fuselage 102 may include one or more control panels that may have buttons, switches, knobs, displays, and other interfaces to allow a pilot to operate the helicopter 100. The helicopter 100 also includes rotor systems, a main rotor 104, and a tail rotor 106, that are housed in a portion of the fuselage. The main rotor 104 is positioned at the top of the fuselage 102 and may be operable to provide lift to the helicopter to allow the helicopter 100 to takeoff, land, hover, and fly in the air. The main rotor 104 may include a mast 108 that extends vertically from the roof of the helicopter 100. The mast 108 may be a metal shaft that is configured to rotate based on the operation of the main rotor 104. In some aspects, the mast 108 may be hollow and cylindrical in shape. Rotor blades 110 may be attached to a hub of the mast 108 and extend radially from the mast 108. The rotor blades 110 may act as spinning wings to allow the helicopter to fly. The blades 110 may include an airfoil shape (e.g., have a curved upper portion and a flat lower portion) to allow air traversing the upper portion of the blades 110 to travel faster than air traversing the lower portion to generate lift. The pitch or angle of the blades 110 may be controllable by the pilot to maneuver the helicopter 100 using one or more interfaces in the fuselage 102.

The tail rotor 106 may be configured similarly to the main rotor 104 and positioned at the tail end 112 of the fuselage 102. The tail rotor 106 may include rotor blades 114 attached to hub of a mast extending from the tail end 112 that may rotate to counteract the torque generated by the operation of the main rotor 104. Although the helicopter 100 is shown having two rotor systems, the main rotor 104 and the tail rotor 106, the helicopter 100 may have any number of rotor systems, including one (e.g., a main rotor), without departing from the scope of the present disclosure. Similarly, although the helicopter is shown having a tail rotor 106, the helicopter 100 may include alternative components for counteracting the torque generated by the main rotor 104. Also, the number of rotor blades 110, 114 of the main rotor 104 and the tail rotor 106, respectively, may vary without departing from the scope of the present disclosure.

The helicopter 100 may include a hybrid engine system according to aspects of the present disclosure to drive one or more of the rotor systems of the helicopter 100. Block 116 represents an example placement of a hybrid engine system that may be positioned to drive the main rotor 104. Although the hybrid engine system shown in FIG. 1 is positioned near the roof of the fuselage 102 to drive the main rotor 104, a hybrid engine system according to aspects of the present disclosure may be positioned anywhere in the helicopter 100.

Figure 2:
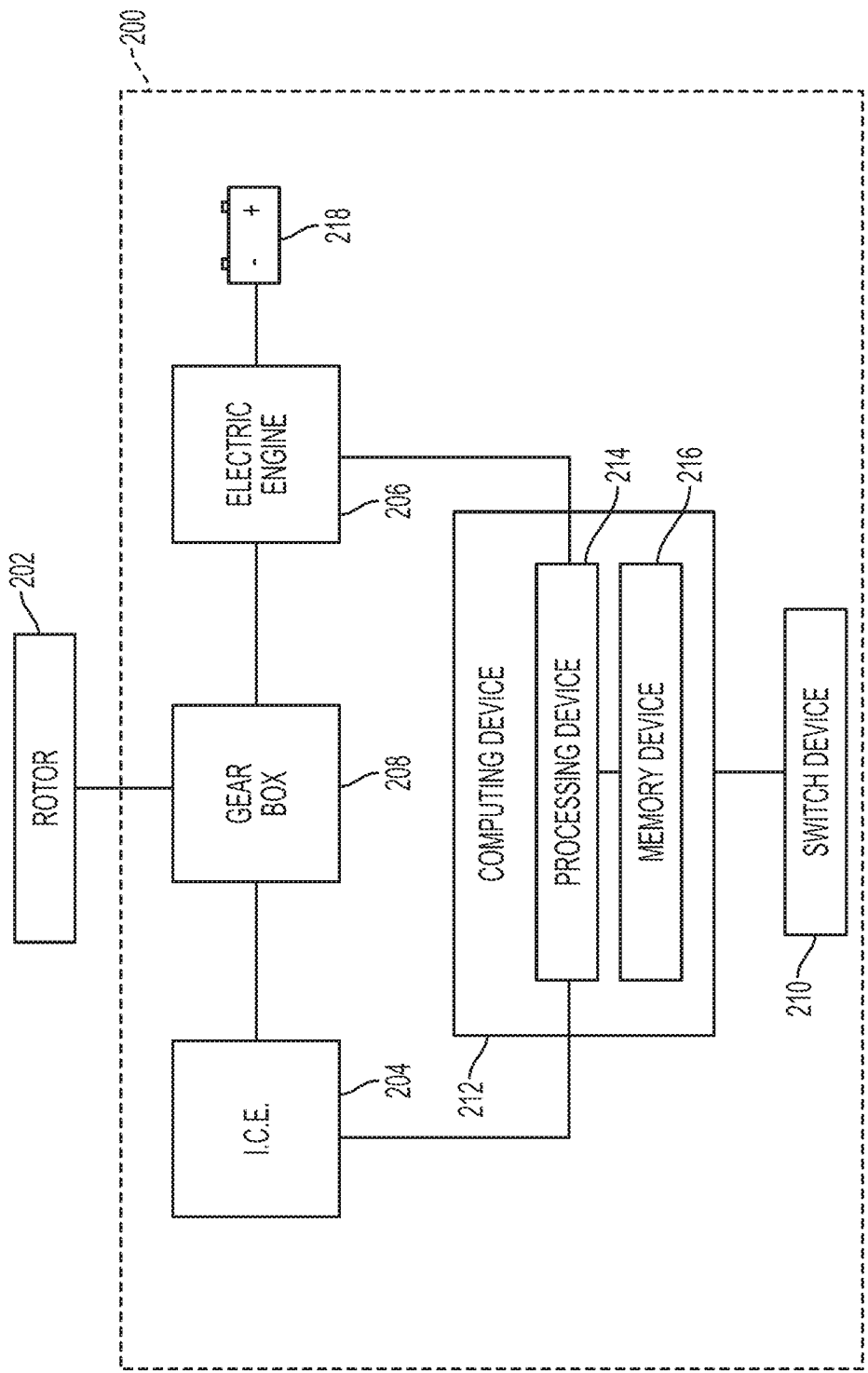
FIG. 2 is block diagram of one example of the hybrid engine system of FIG. 1 according to certain aspects of the present disclosure.

FIG. 2 is a block diagram illustrating an example of a hybrid engine system 200 that may be used to drive a rotor system of the helicopter 100 shown in FIG. 1. In FIG. 2, the hybrid engine system 200 is coupled to and configured to drive a rotor system 202. The rotor system 202 may be a main rotor, tail rotor, or other rotor system of a helicopter. For example, the rotor system 202 may represent the main rotor 104 shown in the helicopter 100 of FIG. 1. The hybrid engine system 200 includes two engines, an internal combustion engine 204 and an electric engine 206. The internal combustion engine 204 may represent any engine that generates motive power by combining a fuel with air or other oxidizer in a combustion chamber to create a combustion that generates a force for driving the rotor system 202. Non-limiting examples of an internal combustion engine 204 may include a gas turbine and a jet engine. The electric engine 206 may include any electric machine configured to covert electric energy into mechanical energy for driving the rotor system 202. Examples of an electric engine may include a magnetic motor, an electrostatic motor, and a piezoelectric motor. In some aspects, the level of noise generated by operation of the electric engine 206 may be less than the level of noise generated by operation of the internal combustion engine 204.

The internal combustion engine 204 and the electric engine 206 may be coupled to the rotor system 202 by a gearbox 208. In some aspects, the gearbox 208 may include one or more gears, shafts, pipes, cables or other means for receiving power generated by the internal combustion engine 204 and the electric engine 206 and allowing the received power to drive the rotor system 202. The engines 204, 206 may be coupled to the gearbox 208 by respective shafts or other suitable means for transmitting the power from the engines 204, 206 to the gearbox 208 for driving the rotor system 202 using the components of the gearbox 208.

The hybrid engine system 200 may also include a switch device 210. The switch device 210 may include a switching circuit coupled to the internal combustion engine 204 and the electric engine 206 for controlling which engine 204, 206 operates the rotor system 202. In some aspects, the switch device 210 may be positioned in the cabin of a helicopter and accessible by a pilot of the helicopter to manually change the operation of the rotor system 202 from the internal combustion engine 204 to the electric engine 206 or from the electric engine 204 to the internal combustion engine 204. In additional and alternative aspects, the switch device 210 may be configured to automatically change the operation of the rotor system 202 in response to a triggering event, including, but not limited to a failure of the internal combustion engine 204. The switching device 210 may be coupled to the internal combustion engine 204 and the electric engine 206 by a computing device 212 as shown in FIG. 2, although other configurations are possible without departing from the scope of the present disclosure. For example, the switching device 210 may be directly connected to the internal combustion engine 204 and the electric engine 206.

In some aspects, the computing device 212 may be the main computer system of the helicopter in which the hybrid engine system is housed. In other aspects, the computing device 212 may be a separate computing system for controlling the operating of the rotor system 202 by the internal combustion engine 204 and the electric engine 206. The computing device 212 may include a processing device 214 and a memory device 216. The memory device 216 may be coupled to the processing device 214 and may include one or more algorithms. The processing device 214 may execute the instructions for switching the operation of the rotor system 202 between the internal combustion engine 204 and the electric engine 206. In some aspects, the processing device 214 may include multiple processing devices. Non-limiting examples of the processing device 214 may include a Field-Programmable Gate Array ("FPGA"), an application-specific integrated circuit ("ASIC"), a microprocessor, etc. Non-limiting examples of the memory device 216 may include electrically erasable and programmable read-only memory ("EEPROM"), a flash memory, or any other type of non-volatile memory. In some aspects, at least a portion of the memory device 216 may include a medium from which the processing device 214 can read the instructions. In some aspects, the memory device 216 may include a computer-readable medium. A computer-readable medium may include electronic, optical, magnetic, or other storage devices capable of providing the processing device 214 with computer-readable instructions or other program code for operating the rotor system 202 using the internal combustion engine 204 and the electric engine 206. Non-limiting examples of a computer-readable medium may include magnetic disk(s), memory chip(s), ROM, random-access memory ("RAM"), ASIC, a configured processor, optical storage, or any other medium from which a computer processor can read the instructions. The instructions may include processor-specific instructions generated by a compiler or interpreter from code written in any suitable computer-programming language (e.g., C, C++, etc.).

In some aspects, the instructions may include processor-specific instructions generated from "if, then" statements or other suitable code for causing the processing device 214 to actuate the internal combustion engine 204 or the electric engine 206 in response to a triggering event. In additional and alternative examples, the triggering event may be monitored by sensors or other means for generating a signal that is transmitted to the processing device 214 and representative of the triggering event.

Table 1 provides non-limiting examples of triggering events and the execution of the processing device in response to the triggering event.

TABLE 1

Triggering events for Operation of the Hybrid Engine System

| Triggering event | Response |
| --- | --- |
| Manually Changing the Switch Device 210 for Operation of the Internal Combustion Engine 204 | Actuating the Electric Engine 206; Turning off the Internal Combustion Engine 204 |
| Manually Changing the Switch Device 210 for | Actuating the Internal Combustion Engine 204; Turning off the Electric |

TABLE 1-continued

Triggering events for Operation of the Hybrid Engine System

| Triggering event | Response |
| --- | --- |
| Operation of the Electric Engine 206 | Engine 206 |
| Manually Changing the Switch Device 210 for Operation of Both Engines 204, 206 | Actuating the non-active engine to allow both engines to be in an operating state |
| Failure of the Internal Combustion Engine 204 | Actuating the Electric Engine 206 |
| Failure of the Electric Engine 206 | Actuating the Internal Combustion Engine 204 |
| Additional power needed | Actuation of both Engines 204, 206 |
| Starting the Helicopter | Actuating the Electric Engine 206 |
| Taking Off | Actuating the Electric Engine 206 |
| Traveling Within a Predetermined Range of a Landing Position | Actuating the Electric Engine 206; Turning off the Internal Combustion Engine 204 |
| Traveling Outside a Predetermined Range of a Landing Position | Actuating the Internal Combustion Engine 204; Turning off the Electric Engine 206 |
| Landing | Actuating the Electric Engine 206 |

The internal combustion engine 204 and the electric engine 206 may be configured to operate individually, or together, to operate the rotor system 202. For example, the engines 204, 206 may operate individually such that when the internal combustion engine 204 is in an operating state, the electric engine 206 may be in a non-operating state and when the electric engine 206 is in an operating state, the internal combustion engine 204 may be in a non-operating state. In some aspects, the operating state of the internal combustion engine 204 and the electric engine 206 may depend on the position or other indication of the switch device 210. For example, the hybrid engine system 200 may be configured such that the default position of the switch device 210 causes the internal combustion engine 204 to drive the rotor system 202. The switch device 210 may be changed to a second position by a pilot or by the computing device 212 to actuate the electric engine 206 to drive the rotor system 202 and to turn off or otherwise halt the operation of the internal combustion engine 204. In another example, the switch 210 may be changed to a third position by the pilot or by the computing device 212 to actuate the electric engine 206 to drive the rotor system 202 together with the internal combustion engine 204. In some aspects, the components of the gearbox 208 may be configured to allow the transmission of power to the rotor system 202 to switch between the internal combustion engine 204 and the electric engine 206 without affecting the rotation of the rotor system 202 for operating the helicopter.

In some aspects, the electric engine 206 may be sized and configured to generate sufficient power for the rotor system 202 to allow the helicopter to start operation of the rotor system 202, to land the helicopter using the rotor system 202, and/or to takeoff from a landing position using the rotor system 202. The electric engine 206 may be coupled to an electric power source 218. The electric power source 218 may be an electric battery or other storage device that may have stored energy for powering the electric engine 206. The electric power source 218 may be sized and configured to provide sufficient power to the electric engine 206 to power the electric engine for a predetermined time or for predetermined operations of the rotor system 202 of the helicopter. The switch device 210 may be manually switched or automatically switched to allow operation of the rotor system 202 by the electric engine 206. In one example, the electric engine 206 may drive the rotor system 202 to start the rotation of the rotor blades of the rotor system 202 (e.g., rotor blades 110 of FIG. 1) and to generate lift to allow the helicopter to takeoff from a heliport or other landing position. Once the helicopter is a predetermined distance from the landing position, the switch device 210 may be changed to actuate the internal combustion engine 204, such that the internal combustion engine 204 drives the rotor system 202 during the majority of the helicopter's route. In another example, the switch device 210 may be changed to actuate the electric engine 206 allow the electric engine to take over operation of the rotor system 202 from the internal combustion engine 204 when the helicopter is nearing a landing position. The electric engine 206 may drive the rotor system 202 to allow the helicopter to land at the landing position.

In additional and alternative aspects, the electric engine 206 may be configured to provide sufficient power to allow the helicopter to remain airborne. For example, the electric engine 206 may be actuated in response to a failure of the internal combustion engine 204. The switch device 210 or the computing device 212 may cause the electric engine 206 to drive the rotor system 202 to allow the helicopter to continue its predetermined trip or to provide power sufficient for the pilot of the helicopter to determine an available landing location and to safely land the helicopter. In this manner, the electric engine 206 may serve as an emergency backup engine for the internal combustion engine 204.

Figure 3:
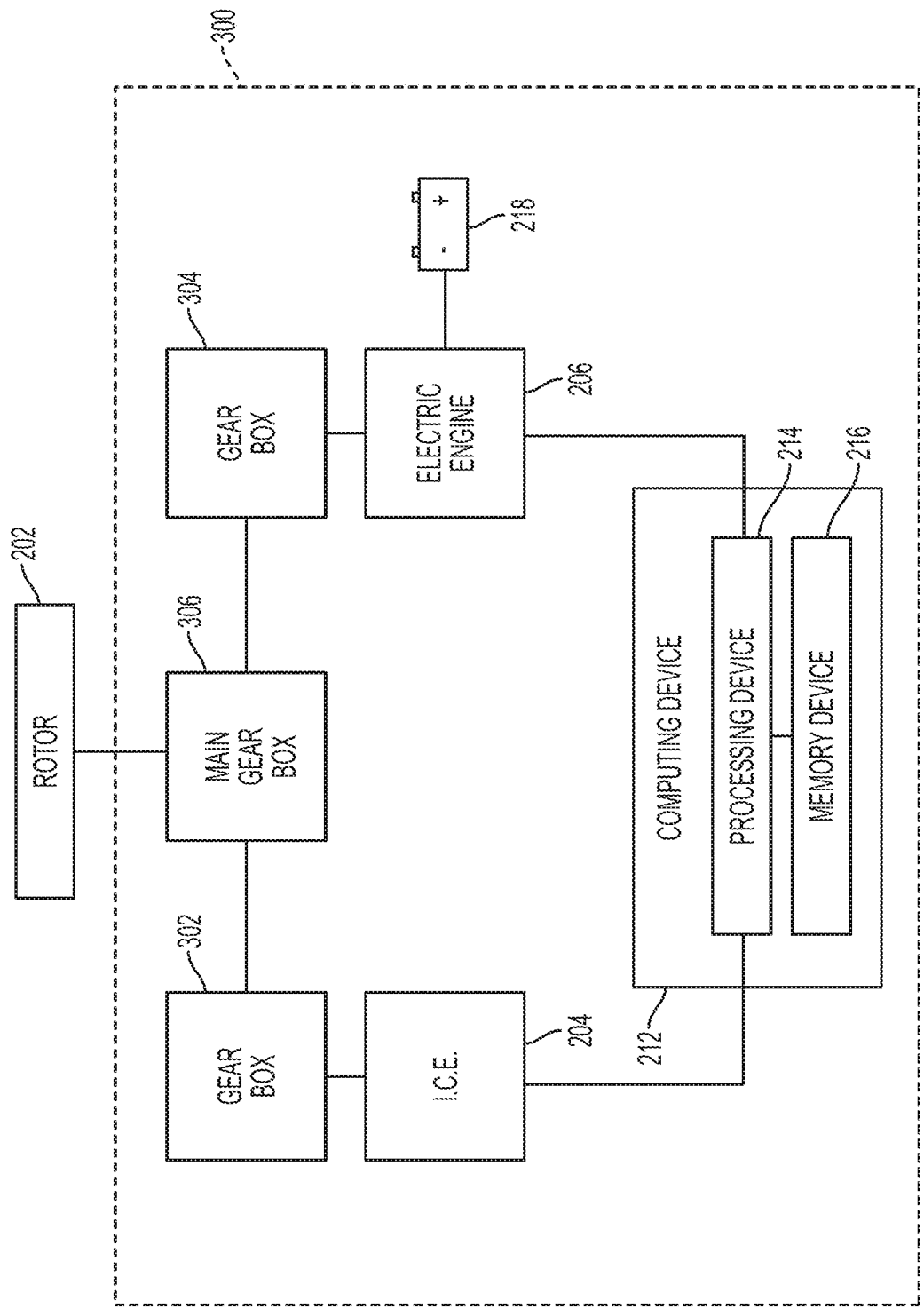
FIG. 3 is a block diagram of another example of the hybrid engine system of FIG. 1 according to certain aspects of the present disclosure.

Although the hybrid engine system 200 is shown as including only one gearbox 208, the gearbox 208 may represent multiple gearboxes coupled to the rotor system 202. For example, FIG. 3 is a block diagram illustrating a hybrid engine system 300 that may be coupled to the rotor system 202 using more than one gearbox. In some aspects, the hybrid engine system 300 may be an alternative configuration of the hybrid engine system 200 of FIG. 2. In FIG. 3, the hybrid system includes separate gearboxes 302, 304 for each of the internal combustion engine 204 and the electric engine 206, respectively. The gearboxes 302, 304 may be coupled to a main gearbox 306 positioned to operate the main rotor 202. Similar to the gearbox 208 of FIG. 2, the gearboxes 302, 304, 306 may include gears, shafts, pipes, or cables for transmitting power from the engines 204, 206 to drive the rotor system 202. In some examples, the internal combustion engine 204 may be coupled to the gearbox 302 by an external shaft that causes the components of the gearbox 302 to move in a manner that transmits power to the main gearbox 306 via an output shaft between the gearbox 302 and the main gearbox 306.

The electric engine 206 may be similarly coupled to the gearbox 304 by an external shaft that causes the components of the gearbox 304 to move in a manner that transmits power to the main gearbox 306 via a second output shaft connected to the main gearbox 306 and positioned between the gearbox 304 and the main gearbox 306. The main gearbox 306 may be configured to drive the rotor system 202 using power transmitted from the internal combustion engine 204 or the electric engine 206. In some aspects, the main gearbox 306 may include redundant components corresponding to each of the internal combustion engine 204 and the electric engine 206. During operation of the internal combustion engine 204, a first set of components of the main gearbox 306 may be operable to drive the rotor system 206. During operation of the electric engine 204, a second set of components of the main gearbox 306 may be operable to drive the rotor system 206. In other aspects, the main gearbox 306 may be configured to seamlessly switch between operation based on power transmitted through gearbox 302 and gearbox 304. For example, the output shafts positioned between the main gearbox 306 and the gearboxes 302, 304, respectively may be configured to rotate passively while the other transmits power to main gearbox 306 to drive the rotor system 202.

In some aspects, the hybrid engine system 300 may be configured to switch between operation of the internal combustion engine 204 and the electric engine 206 using the computing device 212 without the use of a separate switch device. For example, the memory device 216 may include instructions for causing the processing device 214 to switch between the engines 204, 206 in response to a triggering event. In one example, the triggering event may include a failure of the internal combustion engine 204. The processing device 214 may execute instructions for actuating the electric engine 206 in response to receiving a signal indicating that the internal combustion engine has failed or is otherwise not transmitting power to drive the rotor system 202. In another example, the processing device 214 may be communicatively coupled to a positioning device of the helicopter and configured to receive signals indicative of a position of the helicopter. The instructions may include a predetermined range from a location (e.g., a heliport) and may be configured to actuate the electric engine 206 and turn off the internal combustion engine 204 in response to receiving a signal indicating that the helicopter is within the predetermined range. The rotor system 202 may then be driven by the electric engine to travel to the heliport and to land the helicopter on the heliport. Similarly, the instructions may be configured to actuate the internal combustion engine 204 and turn off the electric engine 206 in response to receiving a signal indicating that the helicopter has traveled beyond the predetermined range. The rotor system 202 may then be driven by the internal combustion engine to travel to a destination.

Figure 4:
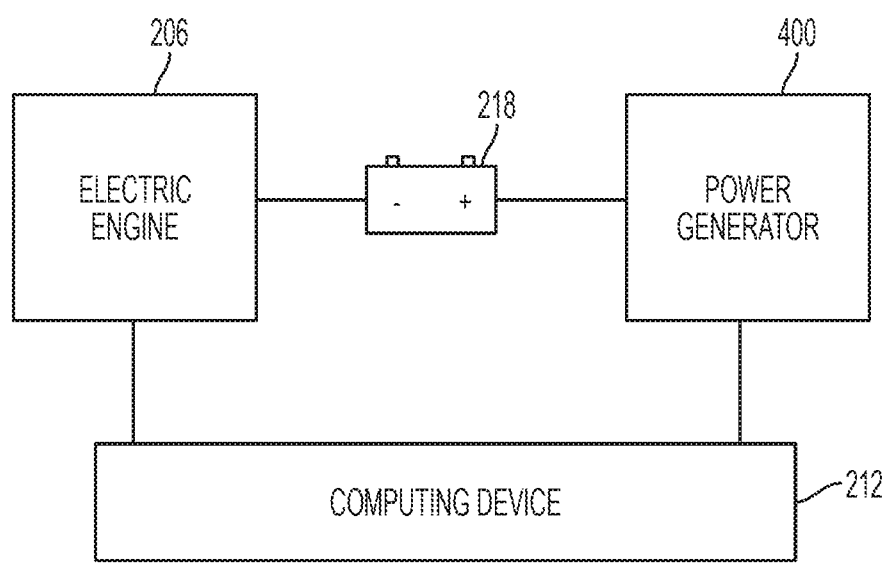
FIG. 4 is a block diagram of an additional engine for generating power for the electric engine of the hybrid engine system of FIG. 2 or 3 according to certain aspects of the present disclosure.

FIG. 4 is a block diagram illustrating a power generator 400 that may be coupled to the power source 218 for the electric engine 206. In some aspects, the power generator 400 may be included in the hybrid engine system 200, 300 of FIGS. 2 and 3, respectively. The power generator 400 may be any suitable device for charging the power source 208 of the electric engine 206. For example, the power generator 400 may be a piston engine or other small engine housed in the fuselage of a helicopter that operates to generate power for charging the power source 218. In another example, the power generator 400 may include a fuel power generator. In some aspects, the power generator 400 may include the internal combustion engine 204 of the hybrid engine systems 200, 300 of FIG. 2 or 3, respectively. For example, the internal combustion engine 204 may be configured to transmit power to both the rotor system 202 and to the power source 218 for charging the power source 218 while the electric engine is inactive. In some aspects, the computing device 212 of FIG. 2 or 3 may be configured to actuate the power generator 400 for generating power to charge the power source 218. For example, a monitoring device (e.g., a sensor) may be coupled to the power source 218 for transmitting signals indicating a power level of the power source 218. In response to a signal indicating a level power at or below a predetermined threshold, the computing device 212 may cause the power generator 400 to be actuated or otherwise transmit power to charge the power source 218.

In alternative aspects, the power generator 400 may represent a power outlet or charging station positioned on the ground. For example, the power generator 400 may include a standard electrical outlet to which the electric engine 206 may be plugged. In another example, the power generator may include a high-current charging station including a fast-charging power outlet to quickly charge the electric engine 206.

Figure 5:
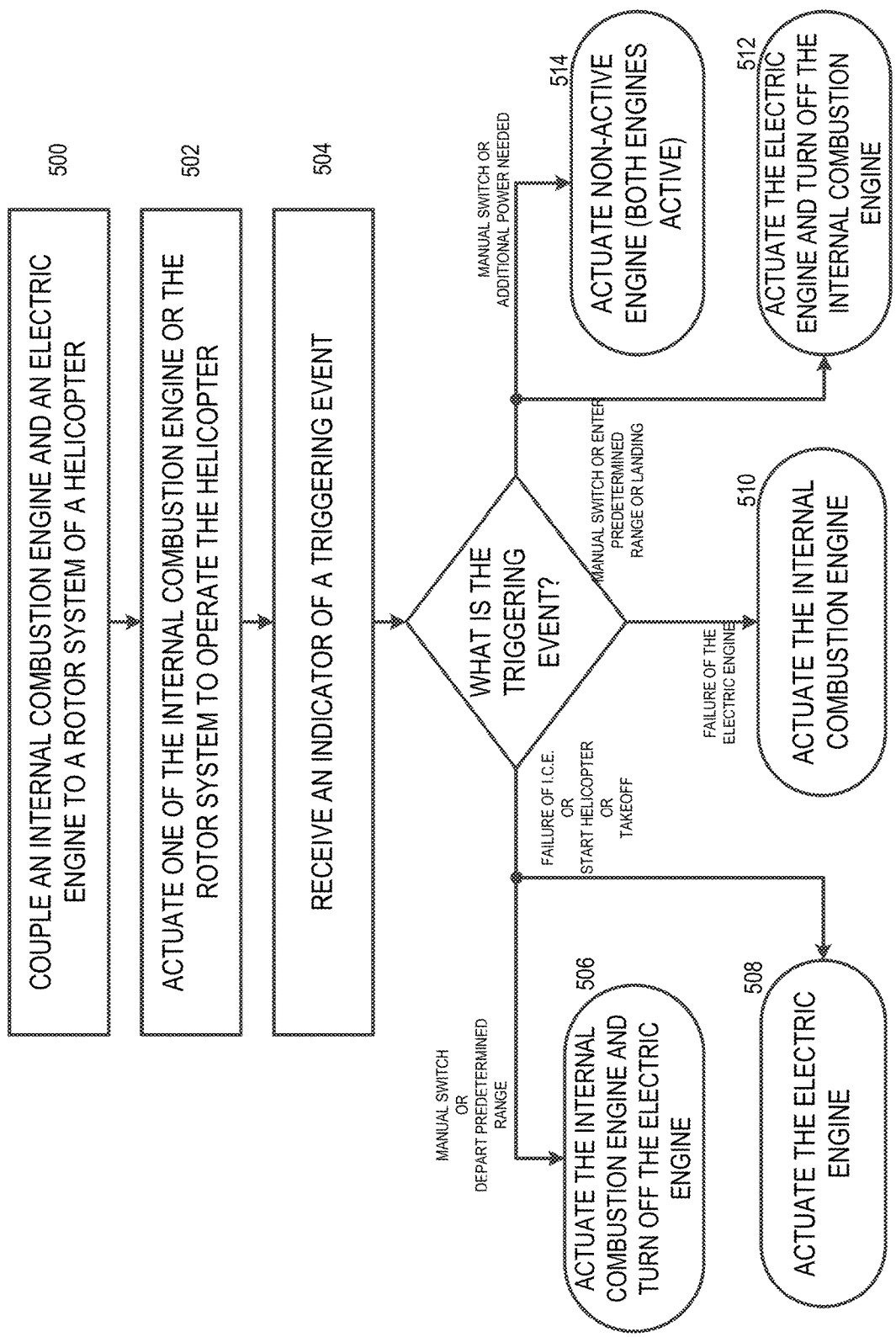
FIG. 5 is a process of operating a rotor system of a helicopter using a hybrid engine system according to certain aspects of the present disclosure.

FIG. 5 is a flow chart illustrating a process for operating a rotor system of a helicopter using a hybrid engine system according to aspects of the present disclosure. For purposes of illustration, the process is described with respect the hybrid engine systems 200, 300 of FIGS. 2 and 3, unless otherwise indicated, although other implementations are possible without departing from the scope of the present disclosure.

In block 500, the internal combustion engine 204 and the electric engine 206 are coupled to the rotor system 202 for operating the rotor system 202. In some aspects, the engines 204, 206 may be coupled to the rotor system 202 using one or more gearboxes. For example, the engines 204, 206 may be coupled to the rotor system 202 using a single gearbox 208 as shown in FIG. 2. In other aspects, the engines 204, 206 may be coupled to the rotor system 202 using multiple gearboxes 302, 304, 306 as shown in FIG. 5.

In block 502, one of the internal combustion engine 204 or the electric engine 206 is actuated to drive the rotor system 202. In some aspects, the rotor system 202 may be controlled by the computing device 212 coupled to the rotor system 202 via the engines 204, 206. The engines 204, 206 may be configured to operate individually such that only one of the engines 204, 206 is operable to drive the rotor system 202 at a time. The computing device 212 may control which of the engines 204, 206 is actuated for driving the rotor system 202 and may switch between the engines 204. In some aspects, the step of block 502 may be optional. For example, a triggering event, as described in blocks 504 and 508 below, may cause the electric engine 206 to be actuated to start the helicopter or rotor system 202 without a preceding actuation of one of the internal combustion engine 204 or the electric engine 206.

In block 504, a triggering event may be received. In some aspects, the triggering event may be received by the computing device 212 for causing the computing device 212 to actuate one of the internal combustion engine 204 or the electric engine 206 and, if necessary, turn off the operating engine 204, 206. In some aspects, the triggering event may correspond to an operation of the helicopter. For example, the hybrid engine system 200 may receive a signal from the switch device 210 or from a sensor attached to the internal combustion engine. In another example, the triggering event may correspond to starting the helicopter or rotor system 202, or from the pilot causing the helicopter to takeoff from or land on a heliport or other landing location. In other aspects, the triggering event may correspond to a position of the helicopter. The position of the helicopter may be determined by a global positioning system or other positioning system for tracking the location of the helicopter with respect to a predetermined location. For example, the triggering event may correspond to a position a certain distance away a predetermined landing position.

In block 506, in response to the switching device 210 being manually switched for operation of the internal combustion engine 204 or in response to the helicopter traveling outside of a predetermined range from a landing position, the computing device 212 may cause the internal combustion engine 204 to be actuated and, if active, the electric engine 206 to turn off. In block 508, in response to a failure of the internal combustion engine 204 to operate the rotor system 202, a startup of the helicopter or rotor system 202, or a taking off of the helicopter from a landing position, the computing device 212 may actuate the electric engine 206.

In block 510, in response to a failure of the electric engine 206 to operate the rotor system 202, the computing device 212 may actuate the internal combustion engine 204. In block 512, in response to the switch device 210 being manually switched for operation of the electric engine 206, in response to the helicopter entering a predetermined range from a landing position, or in response to the helicopter landing at the landing position, the computing device 212 may cause the electric engine 206 to be actuated and, if active, turn off the internal combustion engine 204. In block 514, in response to the switch device 210 being manually switched for operation of both the internal combustion engine 204 and the electric engine 206, or in response to needing additional power for operating the rotor system 202, the non-active engine, or the engine that is not in an operating state, may be actuated to allow both engines 204, 206 to operate the rotor system 202.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive, and the invention is not limited to these example embodiments but rather encompasses all possible modifications and variations within the scope of the issued claims and their equivalents.

EC 1. A system comprising: an electric engine couplable to a rotor system of a helicopter for operating the rotor system in an absence of a load to the rotor system from an internal combustion engine of the helicopter.

EC 2. The system of any of the preceding or subsequent example combinations, further comprising a switch device operable in a first position for causing the internal combustion engine to operate the rotor system and a second position for causing the electric engine to operate the rotor system.

EC 3. The system of any of the preceding or subsequent example combinations, wherein the switch device is manually changeable between the first position and the second position.

EC 4. The system of any of the preceding or subsequent example combinations, wherein the switch device is automatically changeable between the first position and the second position by a computing device in response to a triggering event.

EC 5. The system of any of the preceding or subsequent example combinations, further comprising: a processing device couplable to the internal combustion engine and the electric engine; and a memory device couplable to the processing device and including instructions executable by the processing device for causing the processing device to actuate the electric engine for operating the rotor system in response to a triggering event.

EC 6. The system of any of the preceding or subsequent example combinations, wherein the processing device is positionable to receive a signal indicative of the triggering event from one of: (1) a switching device, (2) a positioning system, (3) the internal combustion engine, or (4) a sensor positionable for monitoring the internal combustion engine.

EC 7. The system of any of the preceding or subsequent example combinations, wherein the triggering event includes one of: (1) manually changing a switch device to a position for causing the processing device to actuate the electric engine, (2) maneuvering the helicopter within a predetermined range from a landing position, (3) landing the helicopter, (4) actuating the rotor system, (5) maneuvering the helicopter away from the landing position, or (6) a failure of the internal combustion engine to operate the rotor system.

EC 8. The system of any of the preceding or subsequent example combinations, wherein the memory device includes additional instructions executable by the processing device for causing the internal combustion engine to turn off.

EC 9. The system of any of the preceding or subsequent example combinations, further comprising: a processing device couplable to the internal combustion engine and the electric engine; and a memory device couplable to the processing device and including instructions executable by the processing device for causing the processing device to actuate the internal combustion engine for operating the rotor system in response to a triggering event.

EC 10. The system of any of the preceding or subsequent example combinations, wherein the triggering event includes one of: (1) manually changing a switch device to a position for causing the processing device to actuate the internal combustion engine or (2) maneuvering the helicopter beyond a predetermined distance from a landing position.

EC 11. The system of any of the preceding or subsequent example combinations, wherein the electric engine is configured to generate noise at a level that is less than an operating noise level of the internal combustion engine.

EC 12. The system of any of the preceding or subsequent example combinations, further comprising a power source couplable to the electric engine for providing stored energy to the electric engine for operating the rotor system.

EC 13. The system of any of the preceding or subsequent example combinations, further comprising a power generator couplable to the power source for generating energy storable by the power source.

EC 14. The system of any of the preceding or subsequent example combinations, wherein the power generator includes a piston engine.

EC 15. The system of any of the preceding or subsequent example combinations, wherein the power generator includes an electrical outlet.

EC 16. A hybrid engine system, comprising: an internal combustion engine couplable to a rotor system of a helicopter for operating the rotor system; an electric engine couplable to the rotor system of the helicopter for operating the rotor system in an absence of a load to the rotor system from the internal combustion engine; and a computing device couplable to the internal combustion engine and the electric engine for switching operation of the rotor system between the internal combustion engine and the electric engine.

EC 17. The hybrid engine system of any of the preceding or subsequent example combinations, wherein the internal combustion engine is a turbine engine.

EC 18. The hybrid engine system of any of the preceding or subsequent example combinations, further including a switch device couplable to the computing device and positionable in a fuselage of the helicopter for allowing an operator of the helicopter to cause the computing device to switch the operation of the rotor system between the internal combustion engine and the electric engine.

EC 19. The hybrid engine system of any of the preceding or subsequent example combinations, wherein the computing device includes a processing device for which instructions executable by the processing device are used to cause the processing device to automatically actuate the internal combustion engine or the electric engine in response to receiving a signal indicating a triggering event.

EC 20. The hybrid engine system of any of the preceding or subsequent example combinations, wherein the computing device further includes a memory device including additional instructions executable by the processing device for causing the processing device to turn off an operating internal combustion engine or an operating electric engine in response to receiving the signal.

EC 21. The hybrid engine system of any of the preceding or subsequent example combinations, wherein the triggering event includes one of: (1) the helicopter traveling within a predetermined range of a landing position, (2) actuating the rotor system, (3) the rotor system being positioned for causing the helicopter to takeoff from the landing position, (4) the rotor system being positioned for causing the helicopter to land at the landing position, or (5) the internal combustion engine requiring additional power to operate the rotor system; and wherein the instructions are executable by the processing device for causing the processing device to actuate the electric engine in response to receiving the signal indicating the triggering event.

EC 22. The hybrid engine system of any of the preceding or subsequent example combinations, wherein the triggering event includes the helicopter traveling outside of a predetermined range of a landing position or the electric engine requiring additional power to operate the rotor system, wherein the instructions are executable by the processing device for causing the processing device to actuate the internal combustion engine in response to receiving the signal indicating the triggering event.

EC 23. The hybrid engine system of any of the preceding or subsequent example combinations, wherein the triggering event includes a failure of the internal combustion engine to operate the rotor system, wherein the instructions are executable by the processing device for causing the processing device to actuate the electric engine in response to receiving the signal indicating the triggering event.

EC 24. The hybrid engine system of any of the preceding or subsequent example combinations, wherein the triggering event includes a failure of the electric engine to operate the rotor system, wherein the instructions are executable by the processing device for causing the processing device to actuate the internal combustion engine in response to receiving the signal indicating the triggering event.

EC 25. The system of any of the preceding or subsequent example combinations, further comprising a power source couplable to the electric engine for providing stored energy to the electric engine for operating the rotor system.

EC 26. The system of any of the preceding or subsequent example combinations, further comprising a power generator couplable to the power source for generating energy storable by the power source.

EC 27. The system of any of the preceding or subsequent example combinations, further comprising a power generator couplable to the computing device, wherein the computing device includes a processing device and a memory device, the memory device including additional instructions executable by the processing device for causing the processing device to actuate the power generator for generating energy in response to receiving an indicator that an energy storage level of the power source is below a predetermined threshold.

EC 28. A method for operating a rotor system of a helicopter, comprising: receiving, by a computing device, an indicator of a triggering event; actuating one of a first engine or a second engine in response to receiving the triggering event, the first engine and the second engine being coupled to the rotor system and being configured to separately or collectively operate the rotor system.

EC 29. The method of any of the preceding or subsequent example combinations, wherein receiving the triggering event includes receiving a signal from a signal device positioned in a fuselage corresponding to a selection, by an operator of the helicopter, of the first engine or the second engine for operating the rotor system.

EC 30. The method of any of the preceding or subsequent example combinations, wherein receiving the triggering event includes receiving a signal indicating a failure of the first engine to operate the rotor system, wherein actuating one of the first engine or the second engine includes actuating the second engine to operate the rotor system.

EC 31. The method of any of the preceding or subsequent example combinations, wherein receiving the triggering event includes receiving a signal indicative of a position of the helicopter relative to a landing position.

EC 32. The method of any of the preceding or subsequent example combinations, wherein the first engine includes an internal combustion engine, and wherein the second engine includes an electric engine configured to operate at a noise level that is less than an operating noise level of the internal combustion engine.

EC 33. The method of any of the preceding or subsequent example combinations, further including providing stored energy to the first engine for allowing the first engine to operate the rotor system, wherein the first engine is an electric engine.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

That which is claimed:

1. A hybrid engine system, comprising:
   a first engine couplable to a rotor system of a helicopter for operating the rotor system, wherein the first engine comprises a first type of engine technology;
   a second engine couplable to the rotor system of the helicopter for operating the rotor system in an absence of a load to the rotor system from the first engine, wherein the second engine comprises a second type of engine technology different from the first engine; and
   a computing device couplable to the first engine and the second engine for switching operation of the rotor system between the first engine and the second engine,
   wherein the first engine and the second engine are operable in a first operating condition, a second operating condition, and a third operating condition, wherein, in the first operating condition, the first engine operates the rotor system and the second engine is deactivated, wherein, in the second operating condition, the second engine operates the rotor system and the first engine is deactivated, and wherein, in the third operating condition, both the first engine and the second engine operate the rotor system, and
   wherein the computing device is configured to:
   receive a signal indicating a triggering event, the triggering event indicative of a position of the helicopter relative to a landing position; and actuate one of the first engine or the second engine in response to receiving the signal.

2. The hybrid engine system of claim 1, further comprising:
a switch device couplable to the computing device and positionable in a fuselage of the helicopter,
wherein the switch device is configured to allow an operator of the helicopter to cause the computing device to switch the operation of the rotor system between the first engine and the second engine.

3. The hybrid engine system of claim 2, wherein the computing device comprises:
a processing device for which instructions executable by the processing device are used to cause the processing device to automatically actuate the first engine or the second engine in response to receiving the signal indicating the triggering event; and
a memory device comprising additional instructions executable by the processing device for causing the processing device to deactivate the first engine or the second engine in response to receiving the signal and if not already deactivated.

4. The hybrid engine system of claim 3, wherein the triggering event comprises at least one of:
the helicopter traveling within a predetermined range of a landing position;
actuating the rotor system;
the rotor system being positioned for causing the helicopter to takeoff from the landing position;
the rotor system being positioned for causing the helicopter to land at the landing position; or
the first engine requiring additional power to operate the rotor system; and wherein the instructions are executable by the processing device for causing the processing device to actuate the second engine in response to receiving the signal indicating the triggering event.

5. The hybrid engine system of claim 3, wherein the triggering event comprises the helicopter traveling outside of a predetermined range of the landing position or the second engine requiring additional power to operate the rotor system, and wherein the instructions are executable by the processing device for causing the processing device to actuate the first engine in response to receiving the signal indicating the triggering event.

6. The hybrid engine system of claim 3, wherein the triggering event comprises a failure of the first engine to operate the rotor system, and wherein the instructions are executable by the processing device for causing the processing device to actuate the second engine in response to receiving the signal indicating the triggering event.

7. The hybrid engine system of claim 3, wherein the triggering event comprises a failure of the second engine to operate the rotor system, and wherein the instructions are executable by the processing device for causing the processing device to actuate the first engine in response to receiving the signal indicating the triggering event.

8. The hybrid engine system of claim 1, wherein the first engine is an internal combustion engine and wherein the second engine is an electric engine.

* * * * *